H. BARNETT.
AUTOMOBILE SWITCHING TRUCK.
APPLICATION FILED JULY 18, 1917.
1,261,681.
Patented Apr. 2, 1918.
2 SHEETS—SHEET 2.
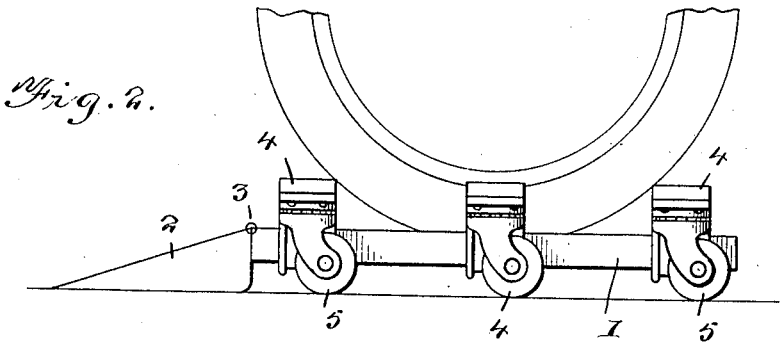
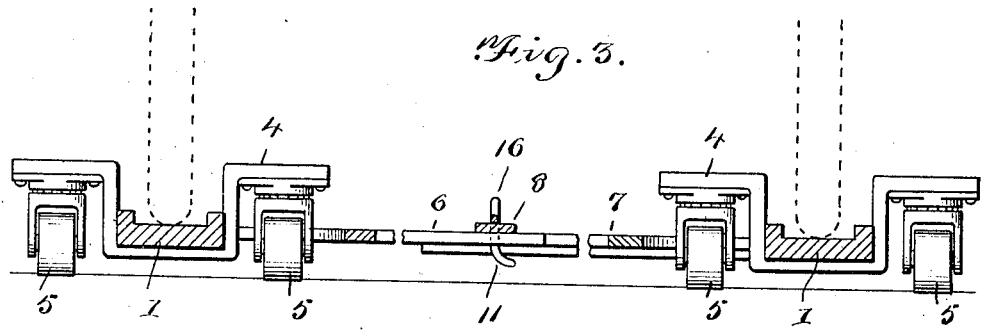
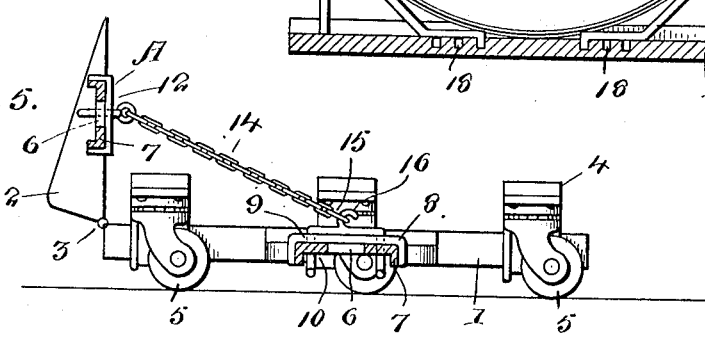
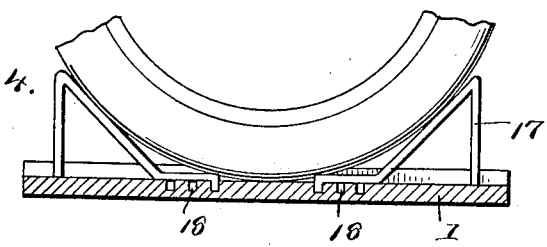
INVENTOR
Herbert Barnett
BY Victor J. Evans
ATTORNEY
WITNESSES

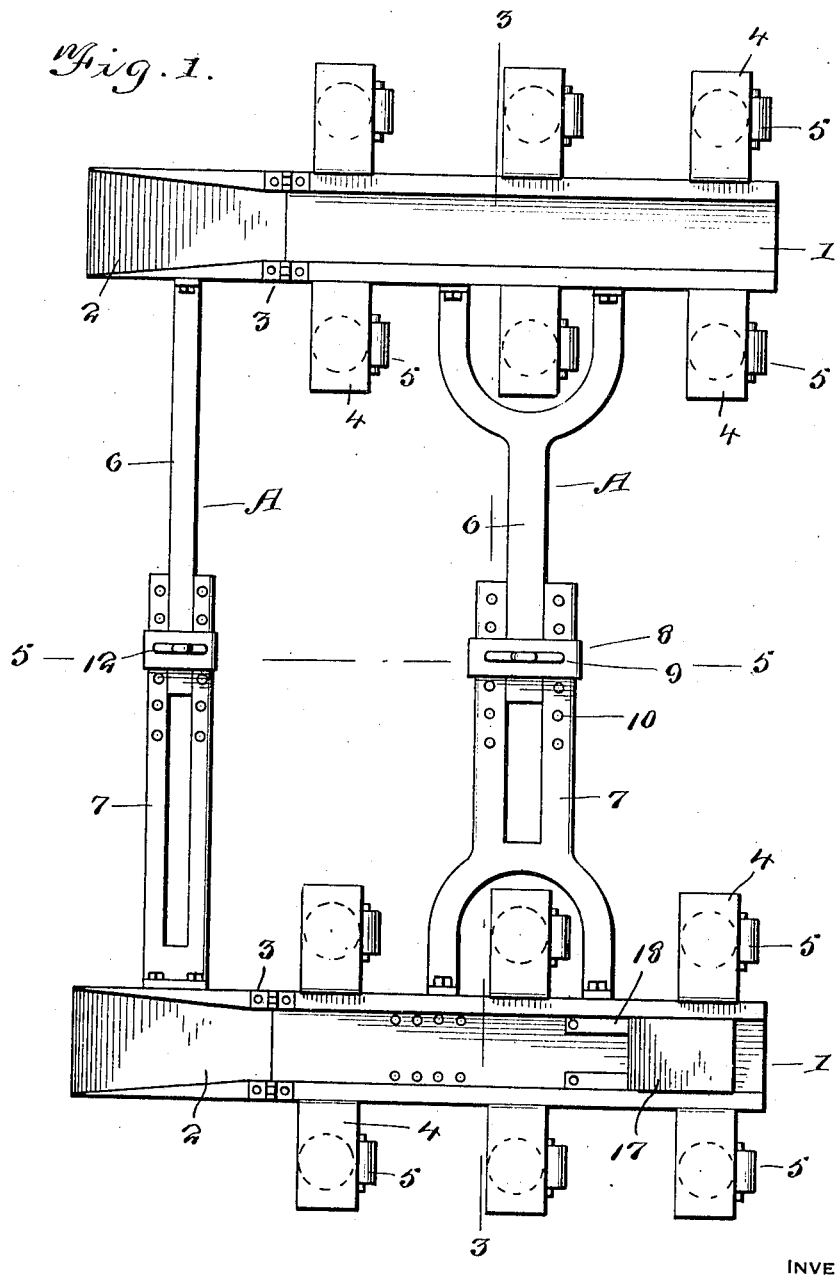

UNITED STATES PATENT OFFICE.

HERBERT BARNETT, OF KINGSTON, ONTARIO, CANADA.

AUTOMOBILE-SWITCHING TRUCK.

1,261,681.   Specification of Letters Patent.   Patented Apr. 2, 1918.

Application filed July 18, 1917. Serial No. 181,387.

*To all whom it may concern:*

Be it known that I, HERBERT BARNETT, a subject of the King of Great Britain, residing at Kingston, in the Province of Ontario and Dominion of Canada, have invented new and useful Improvements in Automobile-Switching Trucks, of which the following is a specification.

This invention relates to automobile switching trucks, the object in view being to produce a simple, durable and convenient truck upon which the wheels of an automobile or other motor vehicle are adapted to be driven and upon which they are adapted to be supported, the improved truck enabling the rear or front of a motor vehicle to be shifted in any direction for the purpose of compactly arranging or disposing motor vehicles in a limited space, at the same time enabling them to be removed from such limited space and shifted about from place to place as may be found necessary.

With the above and other objects in view, the invention consists in the novel construction, combination and arrangement of parts, herein fully described, illustrated and claimed.

In the accompanying drawings:—

Figure 1 is a plan view of the improved truck.

Fig. 2 is a side elevation thereof showing the method of using the truck.

Fig. 3 is a cross section on the line 3—3 of Fig. 1.

Fig. 4 is a detail view of one of the chocks.

Fig. 5 is a side elevation of the truck partly in section, showing the inclined run way in its elevated position.

Fig. 6 is a detail perspective view of the coupling pin.

The automobile switching truck contemplated in this invention, comprises as the essential elements thereof, a pair of wheel rests 1 and a pair of inclined runways or approaches 2 leading to the rests 1 and connected thereto by means of hinges 3, adapting the inclined runways 2 to be folded upwardly out of the way during the shifting operation or folded upwardly and then downwardly on the rests 1 when not in use for the sake of compactness and storage or transportation purposes.

Fastened to each of the wheel rests 1 and preferably arranged at opposite sides of each wheel rest is a plurality of caster wheel hangers 4, there preferably being six of such hangers arranged in oppositely disposed pairs as clearly indicated in Figs. 1 and 3. The hangers 4 rise from and above the top surfaces of the wheel rests 4 so that the latter may be located in a low down position close to the ground or floor thereby reducing the power or energy required to move the vehicle upwardly on the inclined runways 2 until the wheels are rolled upon the wheel rests 1. Each of the hangers 4 has attached thereto a swiveled ball bearing caster wheel 5 free to turn in any direction.

The wheel rest 1 and the inclined runways 2 are connected by longitudinally extensible connecting bars each of which is designated generally at A, each of said connecting bars comprising a tongue-like member 6 and a tongue-receiving member 7. The tongue-like member 6 has attached to the free end thereof a runner 8 and said runner is provided at opposite sides of the tongue 6 with holes 9 while the tongue-receiving member 7 is provided with longitudinal series of holes 10 arranged transversely opposite each other, the holes 9 being adapted to register with the holes 10 in order to enable the arms 11 of a two-armed coupling pin 12 to be inserted through said holes for the purpose of preventing any further relative slidable movement between the tongue 6 and the tongue-receiving member 7. The extremities of the arms 11 are bent substantially at right angles to form retaining fingers or extremities 13 which will prevent said two-armed coupling pin from becoming accidentally displaced during the shifting movement of the truck. By the means just described, the wheel rests 1 and the inclined runways or approaches 2 are prevented from moving toward and away from each other. At the same time provision is made for adjusting the distance between the wheel rests 1 and the runways 2 to accommodate wheel bases of different gages or widths. A raising and lowering connection 14, shown in the form of a chain, is connected at one end to the pin 12 which is associated with the connecting bar A which unites the inclined runways, and said chain is provided at its free end with an eye or ring 15 adapted to be detachably engaged with a hook 16 of the two-armed coupling pin 12 which is associated with the connecting bar A which couples the wheel rests 1. After the wheels of the automobile have been positioned upon the wheel rests 1, the attendant by grasping the chain or connection 14 may rock the runways 2 upwardly and then connect the chain 14 to the hook 16, thereby holding the runways in their elevated positions which will facilitate the shifting of the truck from place to place while the automobile wheels are resting upon and supported thereby.

It will of course be understood that two trucks such as hereinabove described may be used, one to support the rear wheels and the other to support the front wheels of the vehicle, which will facilitate the shifting of the vehicle. The vehicle may be pushed or pulled by hand until the wheels thereof are supported by the wheel rests, or the machine may be propelled by its own power upon and from the truck.

17 represents stop blocks or chocks each of which is formed with a tongue or projection 18 insertible through any one of a longitudinal series of holes in the wheel rest, enabling said stop blocks to be shifted from place to place and properly positioned to prevent the wheels from rolling off the wheel rests during the shifting operation of the switching truck.

I claim:—

In a vehicle switching truck, the combination of a pair of wheel rests arranged at such a distance apart as to support the opposite wheels of a vehicle, a pair of inclined runways having a hinged connection with said wheel rests, longitudinally extensible connecting bars interposed between the wheel rests on the one hand and the inclined runways on the other hand, a coupling pin associated with each of said longitudinally extensible connecting bars, a flexible connection attached to the coupling pin of one of said bars and adapted to be detachably connected to the coupling pin of the other bar, and a plurality of swiveled caster wheels associated with each wheel rest, each of said caster wheels embodying a supporting hanger which rises above the upper surface of the respective wheel rest.

In testimony whereof I affix my signature.

HERBERT BARNETT.

Copies of this patent may be obtained for five cents each, by addressing the "Commissioner of Patents, Washington, D. C."